(12) United States Patent
Ikeda et al.

(10) Patent No.: US 7,005,827 B2
(45) Date of Patent: Feb. 28, 2006

(54) STARTING CIRCUIT FOR SINGLE-PHASE INDUCTION MOTOR

(75) Inventors: Yutaka Ikeda, Higashiomi (JP); Hiroki Tanaka, Higashiomi (JP); Toshiharu Hirota, Hikone (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/177,193

(22) Filed: Jul. 7, 2005

(65) Prior Publication Data

US 2006/0017418 A1   Jan. 26, 2006

(30) Foreign Application Priority Data

Jul. 23, 2004 (JP) .............................. 2004-215978
Jun. 15, 2005 (JP) .............................. 2005-175266

(51) Int. Cl.
*H02P 1/42* (2006.01)

(52) U.S. Cl. ...................... 318/788; 318/783; 361/103; 361/27; 361/29

(58) Field of Classification Search ........ 318/778–797; 361/23–29, 103

See application file for complete search history.

(56) References Cited

U.S. PATENT DOCUMENTS

| | | | | |
|---|---|---|---|---|
| 3,544,869 A | * | 12/1970 | McBride, Jr. et al. | 318/788 |
| 3,562,587 A | * | 2/1971 | Forst | 361/27 |
| 3,683,250 A | * | 8/1972 | Fricker | 318/788 |
| 3,965,392 A | * | 6/1976 | Moorhead et al. | 361/29 |
| 4,161,681 A | * | 7/1979 | Rathje | 318/783 |
| 4,267,635 A | * | 5/1981 | Blaha | 29/622 |
| 4,430,681 A | * | 2/1984 | Benzing | 361/27 |
| 5,345,126 A | * | 9/1994 | Bunch | 310/68 C |
| 5,391,971 A | * | 2/1995 | Yamada et al. | 318/778 |
| 5,451,853 A | * | 9/1995 | Itoh | 318/788 |
| 5,898,289 A | * | 4/1999 | Hamatani | 318/788 |
| 2004/0042142 A1 | * | 3/2004 | Ikeda | 361/103 |

FOREIGN PATENT DOCUMENTS

| | | |
|---|---|---|
| JP | 06-339291 | 12/1994 |
| JP | 09-285168 | 10/1997 |

* cited by examiner

*Primary Examiner*—Paul Ip
(74) *Attorney, Agent, or Firm*—Keating & Bennett, LLP

(57) ABSTRACT

A starting circuit for a single-phase induction motor includes a motor starting positive characteristic thermistor and a triac arranged in a series connection, and a triac control positive characteristic thermistor connected in parallel with the motor starting positive characteristic thermistor, and including one terminal thereof connected to a gate of the triac. The triac control positive characteristic thermistor has a volume in the range of about 4.5 mm$^3$ to about 30 mm$^3$. The relationship of $(\sqrt{2} \times V \times \sin 45°)/R \geq I$ is maintained with the triac control positive characteristic thermistor within an operating temperature range, where V represents a root-mean-square value of a power source voltage, R represents a resistance of the triac control positive characteristic thermistor, and I represents a gate turn-on current of the triac. The gate turn-on current I at an operating temperature of about 25° C. is about 20 mA or less.

9 Claims, 9 Drawing Sheets

FIG. 5

| t/T | 0.15 | 0.20 | 0.25 | 0.30 | 0.35 |
|---|---|---|---|---|---|
| MOTOR STARTING STATE | ○ | ○ | ○ | × | × |

○ : MOTOR SUCCESSFULLY STARTING

× : MOTOR FAILING TO START

STARTING CIRCUIT FOR SINGLE-PHASE INDUCTION MOTOR

BACKGROUND OF THE INVENTION

1. Field of the Invention

The present invention relates to a starting circuit of a single-phase induction motor.

2. Description of the Related Art

A known starting circuit of a single-phase induction motor used in a compressor of an electric refrigerator includes a motor starting positive characteristic thermistor and a triac connected in a serial connection which is in turn connected in series with an auxiliary coil for starting the motor. A triac control positive characteristic thermistor is connected in parallel with the motor starting positive characteristic thermistor. One terminal of the triac control positive characteristic thermistor is connected to a gate terminal of the triac.

In the starting circuit of the single-phase induction motor, a trigger signal, applied to the gate terminal of the triac through the triac control positive characteristic thermistor, causes the triac to be conductive. A motor starting current thus flows through the auxiliary coil via the motor starting positive characteristic thermistor. After a predetermined period of time subsequent to the startup of the motor, the motor starting positive characteristic thermistor reduces the current flowing through the auxiliary coil in response to an increase in resistance resulting from a temperature increase therein. The triac control positive characteristic thermistor reduces the current applied to the gate terminal of the triac in response to an increase in resistance resulting from a temperature increase therein, to thereby turn off the triac. Since the triac control positive characteristic thermistor has a smaller thermal capacity than the motor starting positive characteristic thermistor, power consumption is relatively small.

The starting circuit for the single-phase induction motor has difficulty in properly controlling the current so as to be cut off within a predetermined period of time (typically 1 to 10 seconds) within which the motor completes starting under varied operating temperature conditions. Under a low temperature environment, it takes a relatively long time for the triac control positive characteristic thermistor to reach a high resistance value by self-heating. On the other hand, under a high temperature environment, the resistance is already too high for the motor to operate normally.

Japanese Unexamined Patent Application Publication No. 9-285168 discloses a motor starting circuit. In the disclosed motor starting circuit, a resistance of a triac control positive characteristic thermistor at a temperature of 25° C. (hereinafter referred to as R25) falls within a range of 300 Ω to 3000 Ω, the volume of the triac control positive characteristic thermistor ranges from 30 mm³ to 60 mm³, and the temperature of the triac control positive characteristic thermistor which produces a resistance of twice R25 (the Curie temperature) ranges from 70° C. to 125° C. The disclosed circuit reliably cuts off a current flowing through an auxiliary coil in a predetermined period of time within which a motor completes starting, regardless of variations in operating temperature. Power consumption subsequent to the startup of the motor is reduced. Japanese Unexamined Patent Application Publication No. 6-339291 discloses a technique in which reducing the volume of a triac control positive characteristic thermistor reduces power consumption.

Currently, demands for lower power consumption and miniaturized component parts are increasing. To further reduce power consumption, miniaturization of the triac control positive characteristic thermistor is effective. In accordance with the above-disclosed techniques, reducing the volume of the triac control positive characteristic thermistor to below 30 mm³ is difficult. FIG. 2 shows a plot of the volume versus cutoff time relationship of a triac control positive characteristic thermistor having the Curie temperature of 70° C. at an operating temperature of 100° C. As shown in FIG. 2, the cutoff time greatly varies as the volume is reduced to less than 30 mm³. With such variations, reliable operation of the motor is difficult.

SUMMARY OF THE INVENTION

To overcome the problems described above, preferred embodiments of the present invention provide a starting circuit for a small-power consumption single-phase induction motor including a small-volume triac control positive characteristic thermistor.

According to a preferred embodiment of the present invention, a starting circuit for a single-phase induction motor, incorporated in a motor driver including an auxiliary coil driving the motor at the startup of the motor and a main coil driving the motor in a steady-state drive operation, includes a motor starting positive characteristic thermistor and a triac in a series connection that is connected in series with the auxiliary coil, and a triac control positive characteristic thermistor, connected in parallel with the motor starting positive characteristic thermistor, and having one terminal thereof connected to a gate of the triac. The triac control positive characteristic thermistor has a volume in the range of about 4.5 mm³ to about 30 mm³. The relationship of $(\sqrt{2} \times V \times \sin 45°)/R \geq I$ is maintained with the triac control positive characteristic thermistor within an operating temperature range, where V represents a root-mean-square value of a power source voltage, R represents a resistance of the triac control positive characteristic thermistor, and I represents a gate turn-on current of the triac. The gate turn-on current I at an operating temperature of about 25° C. is about 20 mA or less.

The inventors of the present invention have discovered that proper selection of not only the characteristics of the triac control positive characteristic thermistor, but also a power source voltage and the gate characteristics of the triac achieves a volume of the triac control positive characteristic thermistor of less than about 30 mm³.

In the starting circuit of the single-phase induction motor disclosed in Japanese Unexamined Patent Application Publication No. 9-285168, only the characteristics of the triac control positive characteristic thermistor are defined and no consideration is given to the gate characteristics of the triac and the power source voltage. The inventors of the present invention have discovered that a motor is started with a triac control positive characteristic thermistor having a volume of less than about 30 mm³ without any problem if proper power source voltage and gate characteristics are selected.

The triac is turned on and off in response to the gate current. The magnitude of the gate turn-on current varies depending upon the triac being used. The gate current varies depending upon the power source voltage and the resistance of the triac control positive characteristic thermistor. Even if the triac control positive characteristic thermistor has a volume of less than about 30 mm³, the motor is reliably started with reduced variations in the cutoff time by selecting proper power source voltage and gate characteristics of the triac in addition to selecting proper characteristics of the triac control positive characteristic thermistor. If $Vi/R \geq I$ is maintained, the triac is turned on so as to cause a starting current to flow, where Vi represents an instantaneous value of the power source voltage, R represents a resistance of the triac control positive characteristic thermistor, and I represents a gate turn-on current of the triac.

To reduce the variations in the cutoff time with the triac control positive characteristic thermistor having a volume that is less than about 30 mm$^3$, self-generated heat in the thermistor is reduced by increasing the resistance of the triac control positive characteristic thermistor. With the self-generated heat reduced, the resistance is more gradually increased, and the cutoff time is stabilized. If the resistance of the triac control positive characteristic thermistor is too large, the gate current is reduced, which causes startup failure.

FIG. 3 illustrates the waveforms of the gate current and the starting current of the triac. The gate current, which is an alternating current, is small near zero cross points, and unable to cause the triac to turn on near zero cross points. The starting current flows when the instantaneous value of the gate current exceeds a triac turn-on current (as represented by broken lines 9 as shown in FIG. 3). The starting current is delayed from the gate current (by a firing delay angle), and the root-mean-square value of the starting current is reduced. As a result, a starting torque of the motor deceases, which causes startup failure.

The relationship between the firing delay angle and the startup state of the motor has been studied. FIG. 4 shows test results in which the motor starts up with the firing delay angle of not more than about 45°, while occasionally failing to start with the firing delay angle equal to or greater than about 60°. To cause the motor to reliably start, the firing delay angle of the starting current must be not more than about 45°. Where V represents the root-mean-square value V of the power source voltage, R represents the resistance of the triac control positive characteristic thermistor, and θ represents phase, the magnitude of the gate current Iθ is Iθ=($\sqrt{2}$×V×sin θ)/R. To control the firing delay angle to be not more than about 45°, the triac must be turned on at a phase equal to or less than about 45°.

If the relationship of ($\sqrt{2}$×V×sin 45°)/R≧I is maintained, the motor is successfully and reliably started up.

To reduce variations in the cutoff time with the triac control positive characteristic thermistor having a volume as small as about 30 mm$^3$, the resistance of the triac control positive characteristic thermistor must be increased and the self-generated heat must be reduced. To this end, a triac having a gate turn-on current of about 20 mA or less at an operating temperature of about 25° C. must be used.

FIG. 5 illustrates the relationship between the volume of the triac control positive characteristic thermistor and power consumed at a voltage of about 100 V. As shown, a reduction in power consumption is insignificant even if the volume of the triac control positive characteristic thermistor is reduced to below about 4.5 mm$^3$. If the volume is too small, a temperature increase rate of the thermistor increases. Before the motor starts up, the temperature of the triac control positive characteristic thermistor increases, thereby increasing the resistance thereof, and causing the triac to turn off. If the volume of the triac control positive characteristic thermistor is increased to greater than about 30 mm$^3$, a rate of increase in power becomes large with respect to an increase in volume, and unnecessary power is thus consumed. The volume of the triac control positive characteristic thermistor is preferably in the range of about 4.5 mm$^3$ to about 30 mm$^3$. The triac control positive characteristic thermistor is preferably made of Barium Titanate (BaTiO$_3$).

Tests were conducted to determine whether a triac control positive characteristic thermistor having a volume less than about 30 mm$^3$ reduces variations in cutoff time. In the known motor starting circuit of FIG. 2, the cutoff time greatly varies in response to a variation in volume, if the volume of the triac control positive characteristic thermistor is less than about 30 mm$^3$. In contrast, variations in the cutoff time are reduced in the starting circuit of the single-phase induction motor according to preferred embodiments of the present invention as shown in FIG. 6. The starting circuit of the single-phase induction motor establishes the relationship of ($\sqrt{2}$×V×sin 45°)/R≧I using a triac having a gate turn-on current of about 20 mA or less at an operating temperature of about 25° C. The starting circuit of the single-phase induction motor includes a triac control positive characteristic thermistor having a volume in the range of about 4.5 mm$^3$ to about 30 mm$^3$. By reducing the self-generated heat in the triac control positive characteristic thermistor, the starting circuit of the single-phase induction motor maintains a mild temperature increase in response to a variation in volume, and thus, reduces variations in the cutoff time. In other words, the use of the triac having a gate turn-on current of about 20 mA at an operating temperature of about 25° C. or less causes the motor to reliably start up with reduced variations in the cutoff time. To control the self-generated heat, the use of a triac having a gate turn-on current of about 16 mA or less at an operating temperature of about 25° C. is preferred.

The starting circuit for the single-phase induction motor according to a preferred embodiment of the present invention may be used within an operating temperature range from about −10° C. to about +85° C.

The starting circuit for the single-phase induction motor according to preferred embodiments of the present invention is primarily intended for use with a compressor of an electric refrigerator, and the typical operating temperature range is from about −10° C. to about +85° C. It is sufficient if the relationship of ($\sqrt{2}$×V×sin 45°)/R≧I is maintained within the operating temperature range of from about −10° C. to about +85° C.

In accordance with the starting circuit of the single-phase induction motor of preferred embodiments of the present invention, the relationship of ($\sqrt{2}$×V×sin 45°)/R≧I is established using a triac having a gate turn-on current of about 20 mA or less at an operating temperature of about 25° C. The volume of the triac control positive characteristic thermistor is thus reduced, and power consumption is also reduced.

These and other features, elements, characteristics, steps and advantages of the present invention will become more apparent from the following detailed description of preferred embodiments of the present invention with reference to the attached drawings.

BRIEF DESCRIPTION OF THE DRAWINGS

FIG. 5 illustrates the relationship between the volume of the triac control positive characteristic thermistor in the starting circuit of the single-phase induction motor and power consumed by the starting circuit of the single-phase induction motor at a power source voltage of about 100V;

DETAILED DESCRIPTION OF PREFERRED EMBODIMENTS

First Preferred Embodiment

Figure 1:
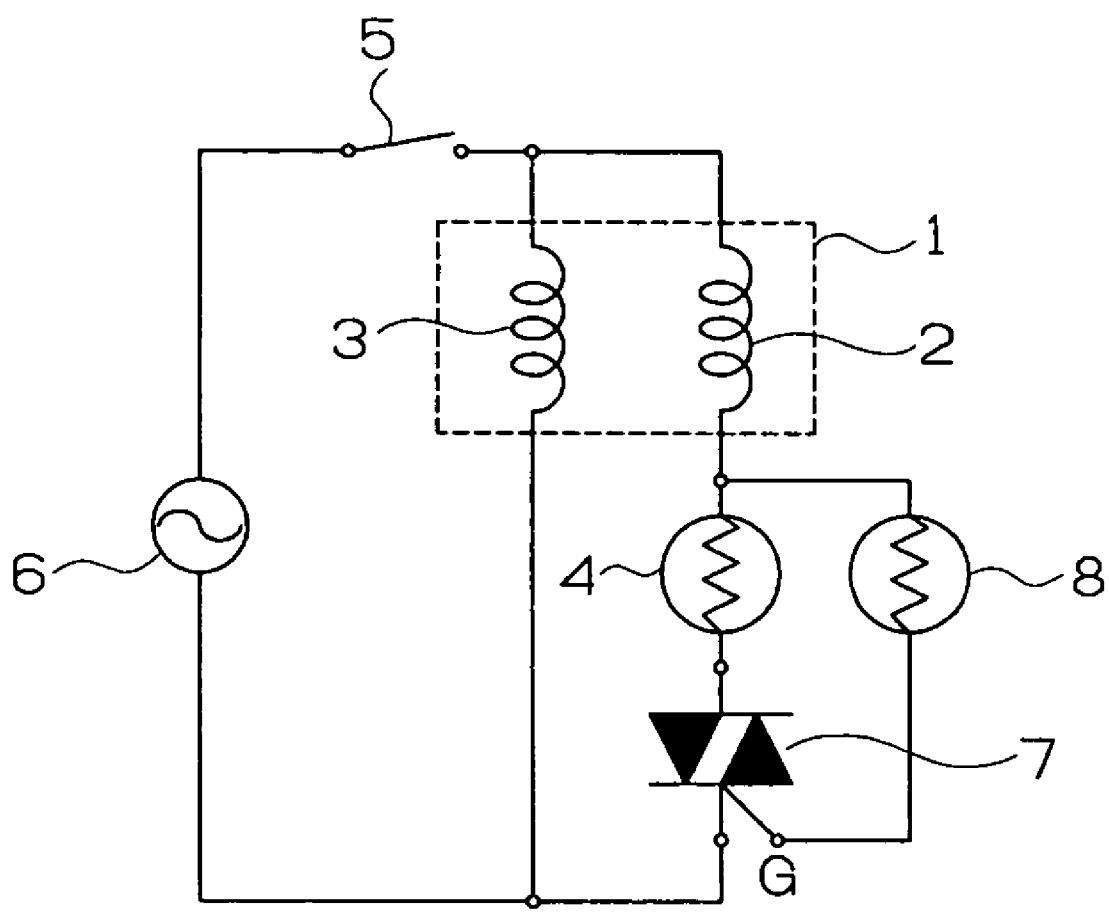
FIG. 1 is a circuit diagram of a starting circuit for the single-phase induction motor in accordance with a preferred embodiment of the present invention.
Figure 2:
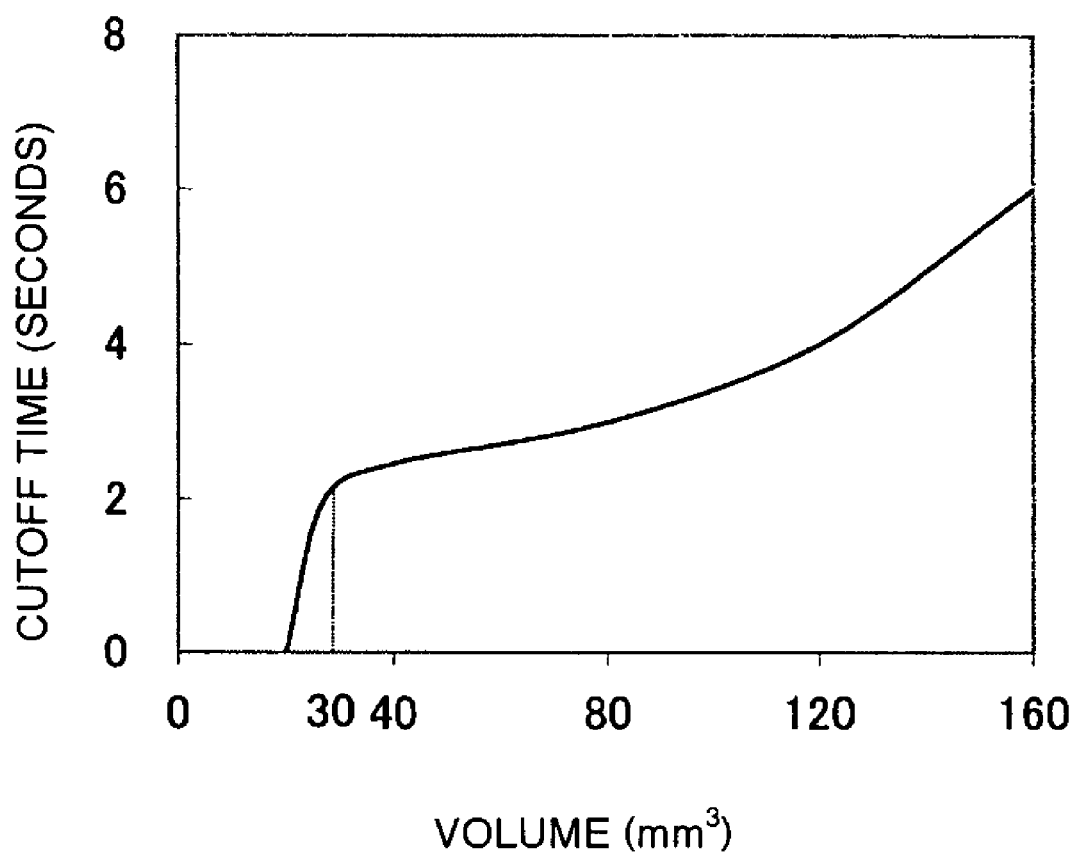
FIG. 2 is a plot of the relationship between the volume and cutoff time of a triac control positive characteristic thermistor in a known starting circuit of the single-phase induction motor.
Figure 3:
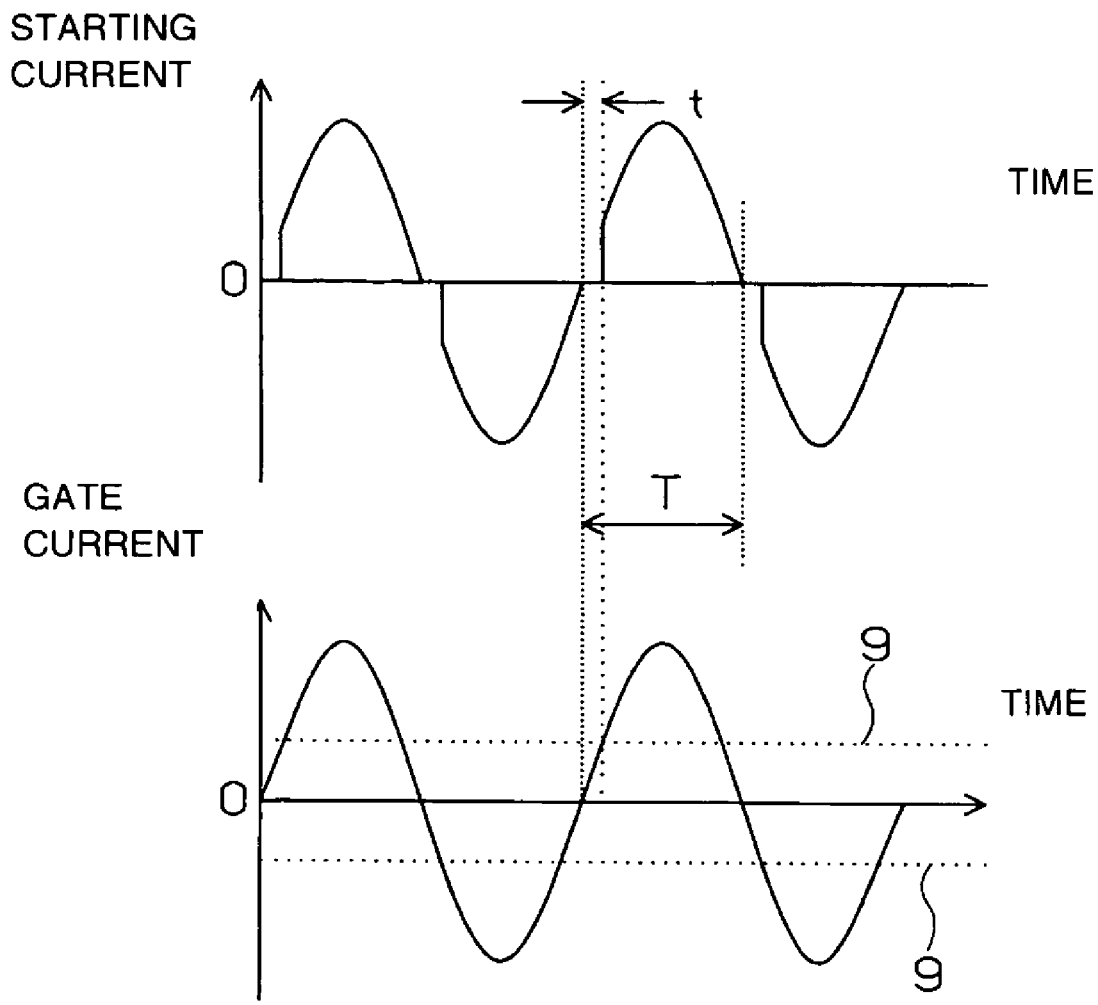
FIG. 3 is a waveform diagram of a gate current and a starting current of the known starting circuit of the single-phase induction motor.
Figure 4:
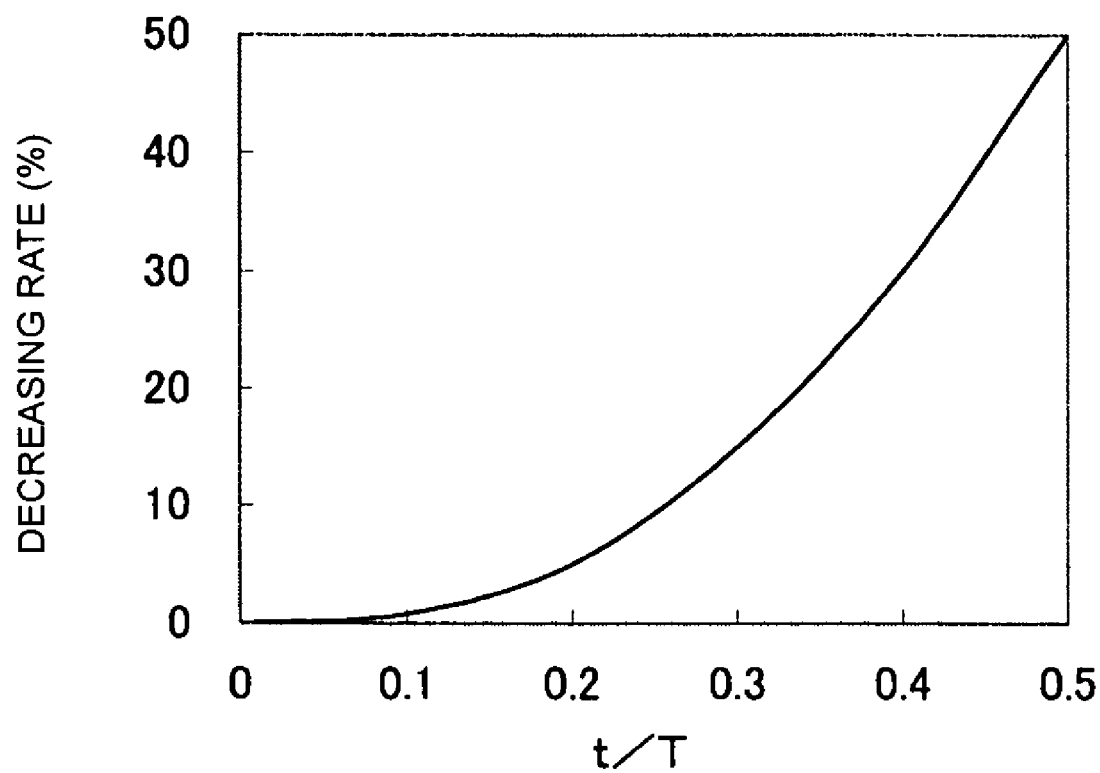
FIG. 4 is a plot of the relationship between a firing delay angle of the starting current responsive to the gate current and a motor startup state in the starting circuit of the single-phase induction motor.
Figure 6:
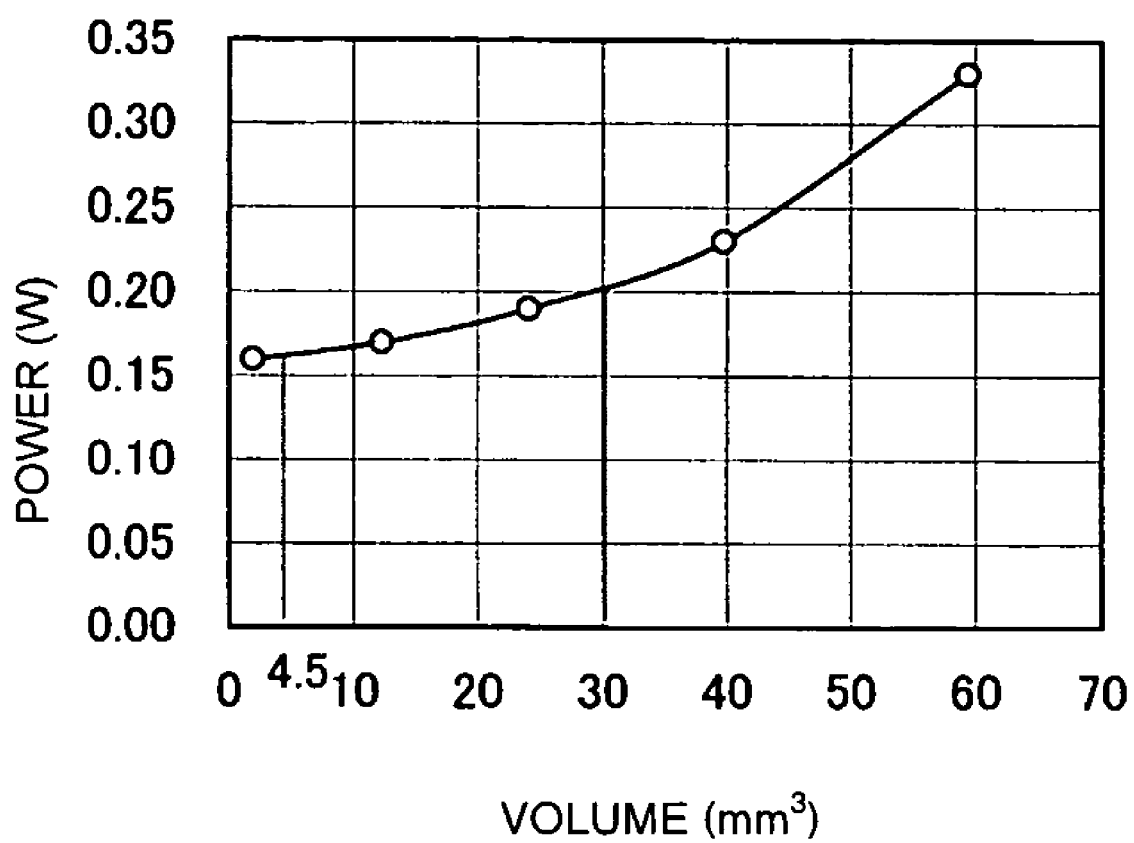
FIG. 6 is a plot of the relationship between the volume and the cutoff time of the triac control positive characteristic thermistor included in the starting circuit of the single-phase induction motor in accordance with a preferred embodiment of the present invention.

The preferred embodiments of the present invention are described below with reference to the drawings. FIG. 1 is a circuit diagram of a starting circuit of a single-phase induction motor in accordance with a first preferred embodiment of the present invention.

A motor 1 includes an auxiliary coil 2 operating at the startup of the motor 1 and a main coil 3 operating to maintain the motor 1 at normal operation. In the starting circuit for the single-phase induction motor in accordance with the first preferred embodiment of the present invention, a motor starting positive characteristic thermistor 4 and a triac 7 are connected in series with the auxiliary coil 2 for starting the motor 1. A triac control positive characteristic thermistor 8 is connected in parallel with the motor starting positive characteristic thermistor 4 with one terminal of the triac control positive characteristic thermistor 8 connected to a gate terminal G of the triac 7. The triac control positive characteristic thermistor 8 is preferably made of a Barium Titanate (BaTiO$_3$) based semiconductor, or other suitable materials.

A power source 6 is connected to the motor 1 via a switch 5. When the motor 1 is powered from the power source 6 with the switch 5 closed, a relatively large current flows through the auxiliary coil 2 via the motor starting positive characteristic thermistor 4 at the initial phase of the startup of the motor 1, thereby starting the motor 1. When the motor 1 is powered from the power source 6 in the starting circuit for the single-phase induction motor at startup, a trigger signal is applied to the gate terminal G of the triac 7 via the triac control positive characteristic thermistor 8, thus making the triac 7 conductive. A motor starting current flows through the auxiliary coil 2 via the motor starting positive characteristic thermistor 4. After a predetermined period of time subsequent to the completion of the startup phase of the motor 1, the motor starting positive characteristic thermistor 4 reduces the current flowing through the auxiliary coil 2 due to an increase in resistance thereof in response to the self-generated heat thereof. The triac control positive characteristic thermistor 8 reduces the current applied to the gate G of the triac 7 due to an increase in resistance thereof in response to the self-generated heat thereof, thereby turning off the triac 7.

In the triac used in the starting circuit for the single-phase induction motor, a power supply voltage has a turn-on gate current of about 20 mA at a power supply voltage of about 220 V and at an operating temperature of about −10° C. The triac control positive characteristic thermistor 8 has a resistance of about 11 kΩ at a temperature of about −10° C., and dimensions of about 2.5 mm in diameter, about 2.5 mm in thickness, and about 12.3 mm$^3$ in volume.

Figure 7:
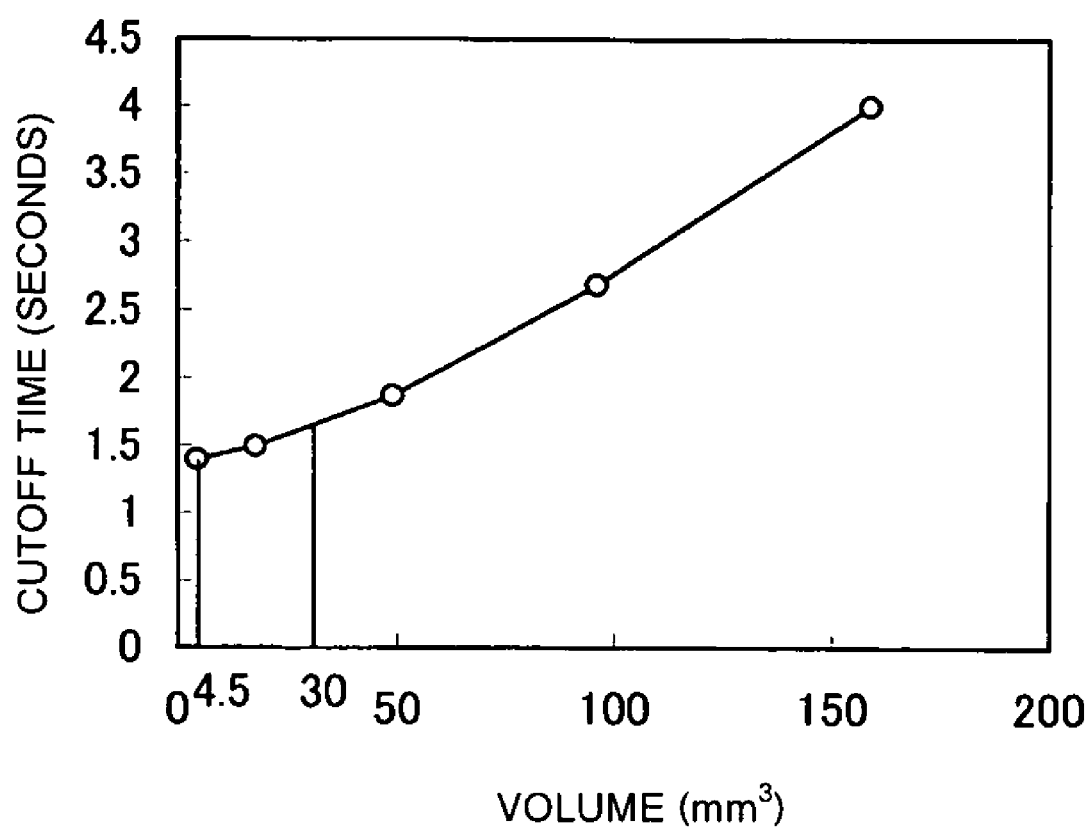
FIG. 7 is a plot of the relationship between the firing delay angle of the starting current and operating temperature in the starting circuit of the single-phase induction motor.
Figure 8:
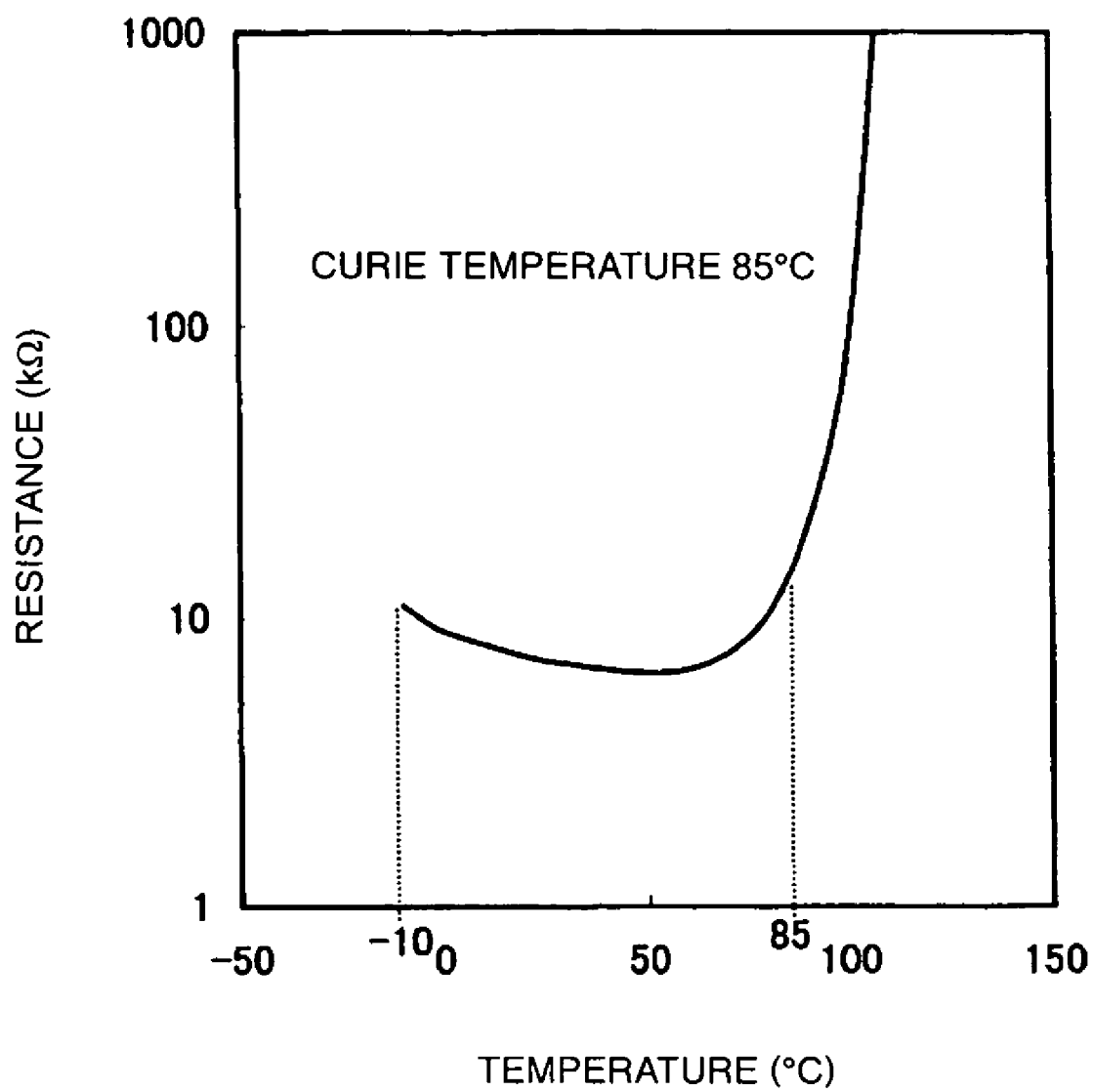
FIG. 8 is a plot of the relationship between the resistance and the operating temperature of the triac control positive characteristic thermistor in the starting circuit of the single-phase induction motor.
Figure 9:
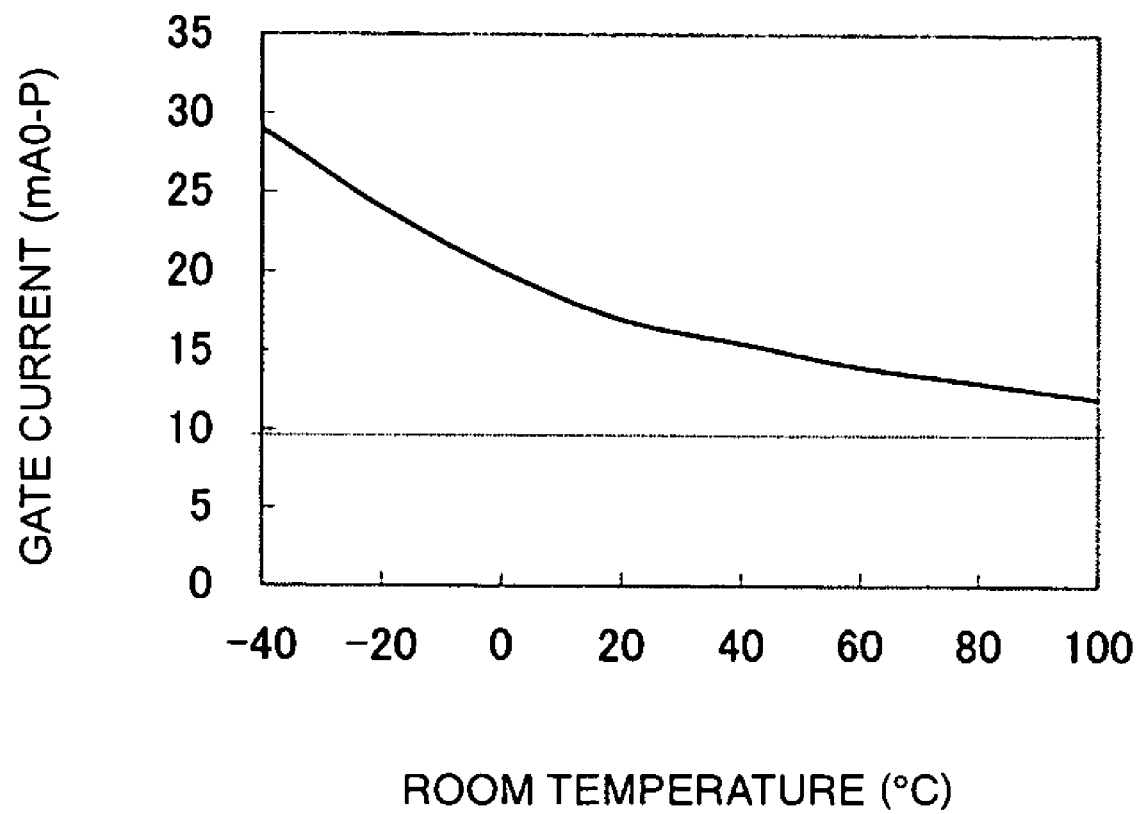
FIG. 9 is a plot of the relationship between the turn-on gate current and the operating temperature of the triac in the starting circuit of the single-phase induction motor.

The triac control positive characteristic thermistor 8 provides a peak firing delay angle of the starting current at a temperature of about −10° C. within an operating temperature range of about −10° C. to about +85° C. as shown in FIG. 7. The resistance of the positive characteristic thermistor increases as temperatures drops below a temperature threshold at which the resistance of the positive characteristic thermistor has a minimum value. FIG. 8 shows the temperature characteristics of the resistance of the triac control positive characteristic thermistor 8 having a Curie temperature of about 85° C. As shown in FIG. 9, the turn-on gate current of the triac is maximized at an operating temperature of about −10° C. within an operating temperature range of about −10° to about +85° C. With these resistance values and the triac turn-on gate current, the firing delay angle reaches a maximum value at an operating temperature of about −10° C. If the relationship of $(\sqrt{2} \times V \times \sin 45°)/R \geq I$ is maintained at an operating temperature of about −10° C., the motor 1 can be started within an operating temperature range of about −10° to about +85° C. A triac having a turn-on gate current of about 25 mA or less at an operating temperature of about 25° C. is used.

If the starting circuit for the single-phase induction motor of the first preferred embodiment of the present invention is applied to the relationship of $(\sqrt{2} \times V \times \sin 45°)/R \geq I$, then 220/11000(=0.02)≧0.02. The relationship of $(\sqrt{2} \times V \times \sin 45°)/R \geq I$ is thus maintained in the starting circuit for the single-phase induction motor.

Tests proved that the starting circuit for the single-phase induction motor of the first preferred embodiment effectively and reliably starts the motor 1.

A triac control positive characteristic thermistor 8 having dimensions of about 1.5 mm in diameter, about 2.5 mm in thickness, and about 4.5 mm$^3$ in volume and a triac control positive characteristic thermistor 8 having dimensions of about 3.5 mm in diameter, about 2.5 mm in thickness, and about 24.1 mm$^3$ in volume effectively and reliably start the motor 1. A triac control positive characteristic thermistor 8 having a volume in the range of about 4.5 mm$^3$ to about 30 mm$^3$ is provided in a starting circuit for the single-phase induction motor including a triac having a gate turn-on current of about 20 mA at an operating temperature of about 25° C. and establishing the relationship of $(\sqrt{2} \times V \times \sin 45°)/R \geq I$. With this starting circuit for the single-phase induction motor, variations in the cutoff time are reduced with respect to a variation in volume by controlling the self-generated heat in the triac control positive characteristic thermistor 8. Thus, the motor 1 is effectively and reliably started with the variations in the cutoff time being reduced when the triac having the gate turn-on current of about 20 mA or less at an operating temperature of about 25° C. is provided.

In accordance with the first preferred embodiment of the present invention, the triac control positive characteristic thermistor 8 in the starting circuit for the single-phase induction motor is reduced in size, leading to small component size and low power consumption.

Second Preferred Embodiment

FIG. 1 is also referred to to describe a circuit diagram of a starting circuit of the single-phase induction motor in accordance with a second preferred embodiment of the present invention. The discussion of the circuit with reference to FIG. 1 is also applicable to the starting circuit for the single-phase induction motor according to the second preferred embodiment.

The starting circuit for the single-phase induction motor of the second preferred embodiment includes a triac operating at a power source voltage of about 100 V and having a triac turn-on gate current of about 30 mA at an operating temperature of about −10° C. The triac control positive characteristic thermistor 8, connected in parallel with the motor starting positive characteristic thermistor 4, includes one terminal connected to the gate G of the triac 7. The triac control positive characteristic thermistor 8 has dimensions of about 2.5 mm in diameter, about 2.5 mm in thickness, and about 12.3 mm$^3$ in volume, and a resistance of about 3.3 kΩ at an operating temperature of about −10° C.

As in the first preferred embodiment of FIG. 7, the firing delay angle of the starting current reaches a maximum at a temperature of about −10° C. within an operating temperature range from about −10° to about +85° C. depending upon the resistance value and the gate turn-on current. If the relationship of $(\sqrt{2}\times V\times \sin 45°)/R \geq I$ is maintained at a temperature of about −10° C., the motor 1 can be started within the operating temperature range of from about −10° C. to about +85° C. A triac having a gate turn-on current of about 20 mA or less at an operating temperature of about 25° C. is preferably used.

If the starting circuit for the single-phase induction motor of the second preferred embodiment of the present invention is applied to the relationship of $(\sqrt{2}\times V\times \sin 45°)/R \geq I$, then $100/33000(=0.03) \geq 0.03$. The relationship of $(\sqrt{2}\times V\times \sin 45°)/R \geq I$ is thus maintained in the starting circuit for the single-phase induction motor.

Tests proved that the starting circuit for the single-phase induction motor of the second preferred embodiment also effectively and reliably starts the motor 1.

A triac control positive characteristic thermistor 8 having dimensions of about 1.5 mm in diameter, about 2.5 mm in thickness, and about 4.4 mm$^3$ in volume and a triac control positive characteristic thermistor 8 having dimensions of about 3.5 mm in diameter, about 2.5 mm in thickness, and about 24.1 mm$^3$ in volume effectively and reliably start the motor 1. A triac control positive characteristic thermistor 8 having a volume in the range of about 4.5 mm$^3$ to about 30 mm$^3$ is provided in a starting circuit for the single-phase induction motor including a triac having a gate turn-on current of about 20 mA at an operating temperature of about 25° C. and establishing the relationship of $(\sqrt{2}\times V\times \sin 45°)/R \geq I$. With this starting circuit for the single-phase induction motor, variations in the cutoff time are reduced with respect to a variation in volume by controlling the self-generated heat in the triac control positive characteristic thermistor 8. Thus, the motor 1 is effectively and reliably started with reduced variations in the cutoff time when the triac having the gate turn-on current of about 20 mA or less at an operating temperature of about 25° C. is provided.

In accordance with the second preferred embodiment of the present invention, the triac control positive characteristic thermistor 8 in the starting circuit for the single-phase induction motor is reduced in size, leading to small component size and low power consumption.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A starting circuit for a single-phase induction motor, included in a motor driver including an auxiliary coil driving the motor at the startup of the motor and a main coil driving the motor in a steady-state drive operation, the starting circuit comprising:
    a motor starting positive characteristic thermistor and a triac arranged in a series connection that are connected in series with the auxiliary coil; and
    a triac control positive characteristic thermistor, connected in parallel with the motor starting positive characteristic thermistor, and including one terminal thereof connected to a gate of the triac; wherein
    the triac control positive characteristic thermistor has a volume in the range of about 4.5 mm$^3$ to about 30 mm$^3$;
    the relationship of $(\sqrt{2}\times V\times \sin 45°)/R \geq I$ is maintained with the triac control positive characteristic thermistor within an operating temperature range, where V represents a root-mean-square value of a power source voltage, R represents a resistance of the triac control positive characteristic thermistor, and I represents a gate turn-on current of the triac; and
    the gate turn-on current I at an operating temperature of about 25° C. is about 20 mA or less.

2. The starting circuit according to claim 1, wherein the operating temperature is in the range of about −10° C. to about +85° C.

3. The starting circuit according to claim 1, wherein the triac control positive characteristic thermistor is made of a BaTiO$_3$ based semiconductor.

4. The starting circuit according to claim 1, wherein the triac control positive characteristic thermistor has a resistance of about 11 kΩ at a temperature of about −10° C.

5. The starting circuit according to claim 1, wherein the dimensions of the triac control positive characteristic thermistor are about 2.5 mm in diameter, about 2.5 mm in thickness, and about 12.3 mm$^3$ in volume.

6. The starting circuit according to claim 1, wherein the dimensions of the triac control positive characteristic thermistor are about 1.5 mm in diameter, about 2.5 mm in thickness, and about 4.5 mm$^3$ in volume.

7. The starting circuit according to claim 1, wherein the dimensions of the triac control positive characteristic thermistor are about 3.5 mm in diameter, about 2.5 mm in thickness, and about 24.1 mm$^3$ in volume.

8. The starting circuit according to claim 1, wherein the dimensions of the triac control positive characteristic thermistor are about 2.5 mm in diameter, about 2.5 mm in thickness, and about 12.3 mm$^3$ in volume.

9. The starting circuit according to claim 1, wherein the triac control positive characteristic thermistor has a resistance of about 3.3 kΩ at a temperature of about −10° C.

* * * * *